United States Patent
Oh et al.

(10) Patent No.: US 7,783,113 B2
(45) Date of Patent: Aug. 24, 2010

(54) PARTITION PATTERN MATCH AND INTEGRATION METHOD FOR ALIGNMENT

(75) Inventors: Seho Oh, Bellevue, WA (US);
Shih-Jong J. Lee, Bellevue, WA (US);
Shinichi Nakajima, Tokyo (JP); Yuji Kokumai, Ageo (JP)

(73) Assignee: DRVision Technologies LLC, Bellevue, WA (US)

( * ) Notice: Subject to any disclaimer, the term of this patent is extended or adjusted under 35 U.S.C. 154(b) by 946 days.

(21) Appl. No.: 10/961,663

(22) Filed: Oct. 8, 2004

(65) Prior Publication Data
US 2006/0078192 A1 Apr. 13, 2006

(51) Int. Cl.
*G06K 9/62* (2006.01)
(52) U.S. Cl. .................. 382/209; 382/217; 382/155
(58) Field of Classification Search ............. 382/209, 382/217, 155, 151, 141
See application file for complete search history.

(56) References Cited

U.S. PATENT DOCUMENTS

| | | | |
|---|---|---|---|
| 5,774,576 A * | 6/1998 | Cox et al. | 382/160 |
| 5,850,466 A * | 12/1998 | Schott | 382/141 |
| 6,301,387 B1 * | 10/2001 | Sun et al. | 382/217 |
| 6,480,624 B1 * | 11/2002 | Horie et al. | 382/165 |
| 6,493,465 B2 * | 12/2002 | Mori et al. | 382/209 |
| 6,603,882 B2 | 8/2003 | Oh et al. | |
| 6,640,008 B1 * | 10/2003 | Lee et al. | 382/218 |
| 6,678,404 B1 * | 1/2004 | Lee et al. | 382/155 |
| 6,941,007 B1 * | 9/2005 | Do | 382/145 |
| 7,079,688 B1 * | 7/2006 | Deco et al. | 382/190 |
| 2002/0122584 A1 * | 9/2002 | Sugawara | 382/151 |
| 2003/0086616 A1 * | 5/2003 | Oh et al. | 382/209 |
| 2003/0179936 A1 * | 9/2003 | Lee et al. | 382/226 |

OTHER PUBLICATIONS

Ballard DH and Brown CM, "Computer Vision", Prentice-Hall Inc. 1982 pp. 68-70.
Silver, B, "Geometric Pattern Matching for General-Purpose Inspection in Industrial Machine Vision", Intelligent Vision '99—Jun. 28-29, 1999.
Uchida,Uchida,Liu,Chitnis "Coarse and Fine Alignment Using Differential Moiré Signals—Simulation and Experiment"Proc. 1st Intern Conf on Positioning, pp. 345-349, Jun. 9-11, 2004.

* cited by examiner

*Primary Examiner*—Daniel G Mariam
*Assistant Examiner*—Aklilu K Woldemariam

(57) ABSTRACT

A partition pattern template generation method for alignment receives a learning image and performs partition template generation using the learning image to generate a plurality of partition template result output. A partition template acceptance test is performed using the plurality of partition template results to generate partition templates or failure result.

A partition template search method for alignment receives an alignment image and partition templates and performs a plurality of template search steps to generate a plurality of matching scores output. A partition integration method is performed using the plurality of matching scores to generate a partition template search result.

A partition integration error self checking method receives a preliminary template search result position and a plurality of the matching scores. A matching score profile comparison is performed using the plurality of the matching scores and the expected matching score profile to generate the template search result.

1 Claim, 17 Drawing Sheets

Partition template generation region 4
710

Partition template generation region 3
708

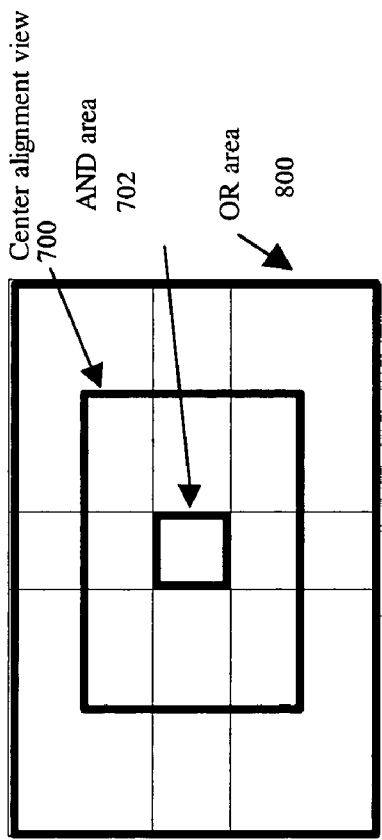
Figure 8A
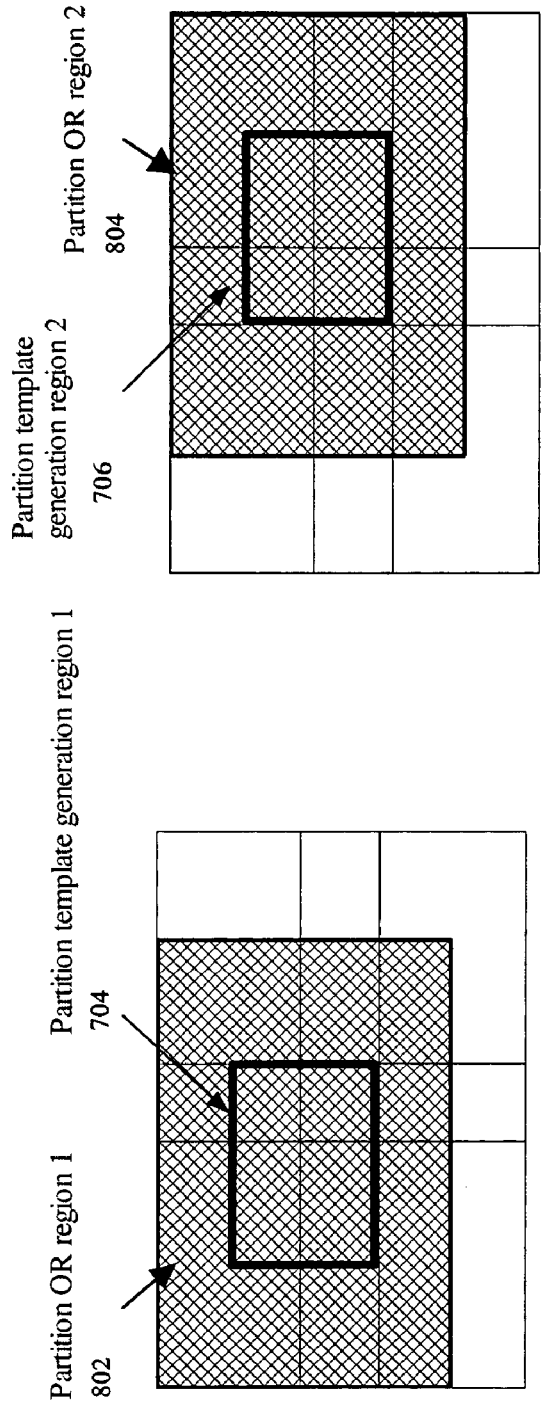
Figure 8B
Figure 8C

| Zone | Partition 1 | Partition 2 | Partition 3 | Partition 4 |
|------|-------------|-------------|-------------|-------------|
| 1 | X | | | |
| 2 | X | X | | |
| 3 | | X | | |
| 4 | X | | X | |
| 5 | X | X | X | X |
| 6 | | X | | X |
| 7 | | | X | |
| 8 | | | X | X |
| 9 | | | | X |

Figure 13B

PARTITION PATTERN MATCH AND INTEGRATION METHOD FOR ALIGNMENT

TECHNICAL FIELD

This invention relates to partition pattern match and integration methods for the automated alignment of objects. The patterns for alignment match are the design structures of the objects rather than pre-defined fiducial marks.

BACKGROUND OF THE INVENTION

Many industrial applications such as electronic assembly and semiconductor manufacturing process require automatic alignment of printed circuit board or semiconductor substrates such as wafers. The alignment can be performed using pre-defined fiducial marks. This requires the make and introduce of the marks into the objects. This process limits the flexibility of the alignment options and increases system complexity. It is desirable to use a portion of the design structures of the object as templates for alignment purpose without specific design of fiducial marks. This removes the extra steps required to produce and insert the special fiducial marks.

The images of design structures of an object such as circuit board or a region of a semiconductor substrate can be acquired for alignment processing. However, the acquired images often exhibit low contrast and may be blurry or noisy in practical applications due to process variations and non-uniform illumination and noisy imaging system due to cost constraint or practical limitations. In this case, both the template selection and the template searching processes could be challenging.

A good template should have unique structures to assure that it will not be confused with other structures. It also needs to have stable and easily detectable features to ease the template searching process. This demands an automatic method and process for the selection of template from the design structures of an object.

The automatic generated templates must be "stable" so that the search algorithm rarely misses the correct template location even if the contrast of the image varies. This is challenging since the images for template generation could include any customer designed patterns.

A prior art fast multi-resolution automatic template generation and search method is disclosed in Oh and Lee, "Automatic template generation and searching method", U.S. Pat. No. 6,603,882, Aug. 5, 2003. It generates a multi-resolution image representation from the input image. Automatic multi-resolution template search using lower resolution results to guide higher resolution search.

However, in the application where the common area that can be always observed is small due to large positioning error, it becomes very difficult to find unambiguous pattern for Pattern Search Alignment (PSA). This is a major problem that could fundamentally hinder the practical use of the PSA.

OBJECTS AND ADVANTAGES

This invention overcomes the prior art problems using a partition pattern match and integration method. This method generates multiple partition templates, each from a larger sized region. There is no guarantee that a new alignment view will contain all of the multiple partition templates. However, it is guaranteed that the new alignment view should contain at least one of the partition templates. Therefore, the pattern search is performed for each partition template separately and then integrates the results. The generation of partition templates from larger regions allows the selection of unambiguous patterns for good PSA results.

The primary objective of this invention is the handling of large positioning error efficiently. The second objective of this invention is to allow the selection of template patterns from large template region partitions and therefore improves the yield (success rate) of template generation. The third objective of this invention is to improve the accuracy and yield (success rate) of template search by the generation of high quality and unambiguous templates from large template region partitions. The fourth objective of this invention is to allow error self checking to achieve high search reliability.

SUMMARY OF THE INVENTION

A template generation method for alignment receives an input object and performs learning image acquisition from the object to generate learning image output. An automatic object pattern based template generation is performed using the learning image to generate a template generation result output.

A template search method for alignment receives an input object and a template containing a template reference position. It performs alignment image acquisition from the object to generate alignment image output. An object pattern based template search is performed using the alignment image and the template to generate template search result output. A comparison is performed using the template search result and the template reference position having alignment data output.

A partition pattern template generation method for alignment receives a learning image and performs a plurality of partition template generation using the learning image to generate a plurality of partition template result output. A partition template acceptance test is performed using the plurality of partition template results to generate partition templates or failure result output.

A partition template search method for alignment receives an alignment image and partition templates and performs a plurality of template search steps to generate a plurality of matching scores output. A partition integration method is performed using the plurality of matching scores to generate a partition template search result output.

A partition integration error self checking method that enhances the reliability of the partition template search result receives a preliminary template search result position and a plurality of the matching scores. A zone conversion method is performed using the preliminary template search result position to generate a zone index output. An expected matching score extraction method is performed using the plurality of the matching scores to generate an expected matching score profile output. A matching score profile comparison is performed using the plurality of the matching scores and the expected matching score profile to generate the template search result output.

BRIEF DESCRIPTION OF THE DRAWINGS

The preferred embodiment and other aspects of the invention will become apparent from the following detailed description of the invention when read in conjunction with the accompanying drawings, which are provided for the purpose of describing embodiments of the invention and not for limiting same, in which:

FIG. 8A illustrates an OR area, the center alignment view and the AND area of an illustrative example;

FIG. 8B thick line highlights of the partition template generation region 1 and the partition OR region 1 in dotted background;

FIG. 8C thick line highlights of the partition template generation region 2 and the partition OR region 2 in dotted background;

DETAILED DESCRIPTION OF THE INVENTION

I. Application Scenario

Figure 1:
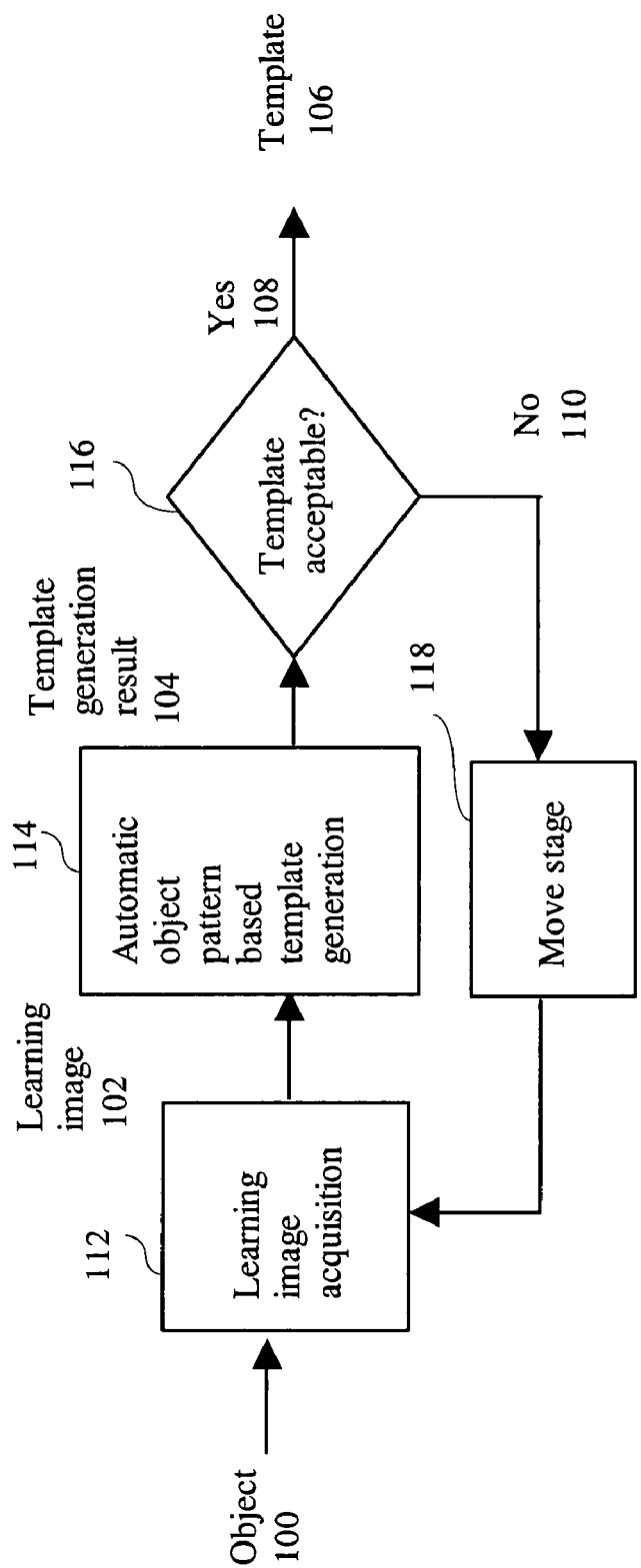
FIG. 1 shows the processing flow for a template generation for alignment application scenario.

FIG. 1 shows the processing flow of the template generation for alignment application scenario. As shown in FIG. 1, the object 100 is inputted to the learning image acquisition step 112. The input object 100 is subjected to an object positioning error that is the amount of alignment required in the application. The learning image acquisition step 112 acquires the learning image 102. The learning image 102 should cover all the appearance of the object under maximum possible positioning error. So it could include a composition of multiple images due to the limited size of the sensor (such as camera) view. An automatic object pattern based template generation step 114 performs template generation using the object pattern rather than pre-defined alignment marks and output a template generation result 104. A further template goodness checking step checks whether the template is acceptable 116 using the template generation result 104 and outputs an acceptance status (Yes 108 or No 110). If the template region contains good (unambiguous) patterns for template generation, the template 106 is accepted as the result of the template generation and the template generation process is completed. Otherwise, the stage is moved 118 to other locations for acquiring new template learning image and the template generation process is repeated.

Figure 2:
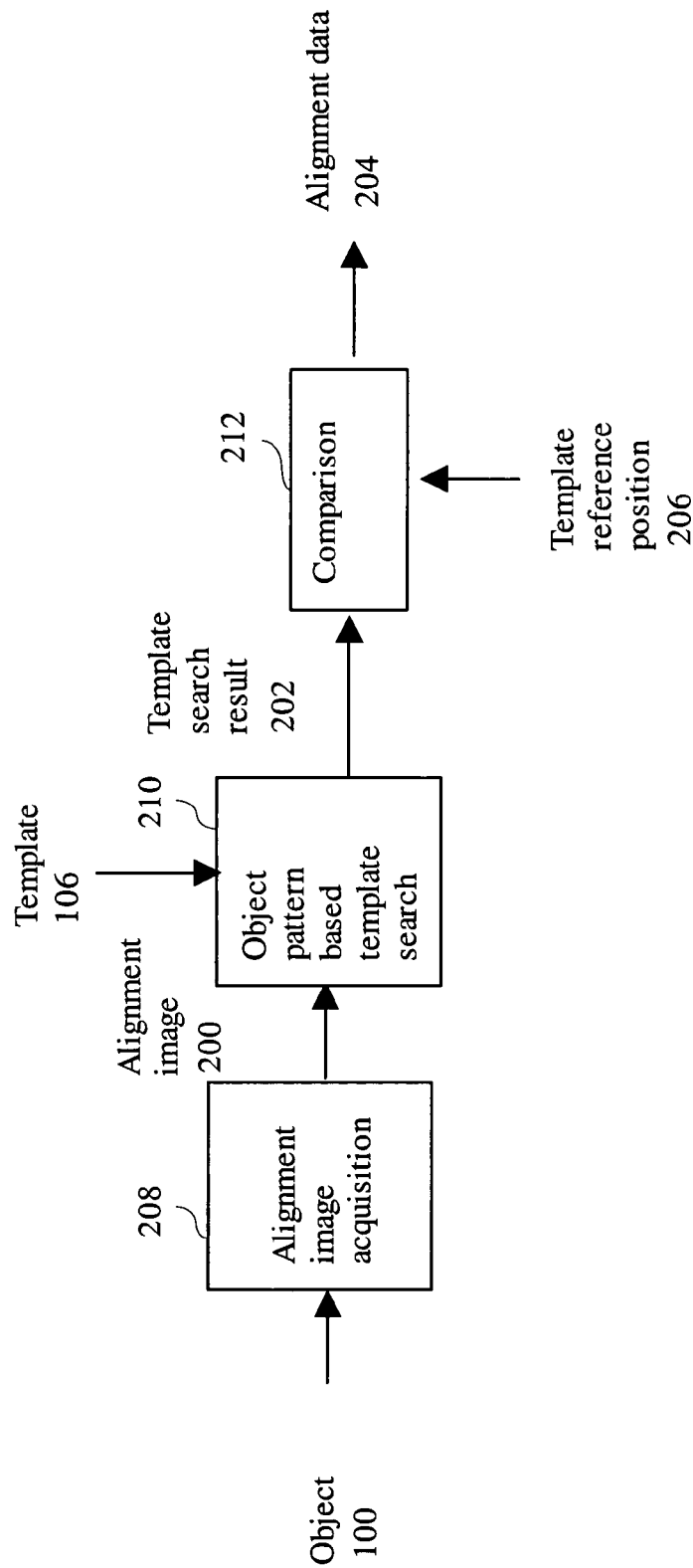
FIG. 2 shows the processing flow for a template search for alignment application scenario.

FIG. 2 shows the processing flow of the template search for alignment application scenario. As shown in FIG. 2, an object 100 of the same type as the object used for learning is inputted to an alignment image acquisition step 208. An alignment image 200 is acquired by the alignment image acquisition step 208. The alignment image 200 is subjected to the object pattern based template search step 210 that inputs the template 106 generated in the object pattern based template generation process (FIG. 1) and the alignment image 200 and results in a template search result output 202. The template search result 202 output contains template search position which is subjected to a comparison 212 with the template reference position 202, which is stored in the template 106, and results in an alignment data 204 output. The alignment data 204 includes the alignment shift amount. In one embodiment of the invention, the comparison step 212 subtracts the template search position from the template reference position 206.

II. OR Area, Alignment View, and AND Area

Figure 3:
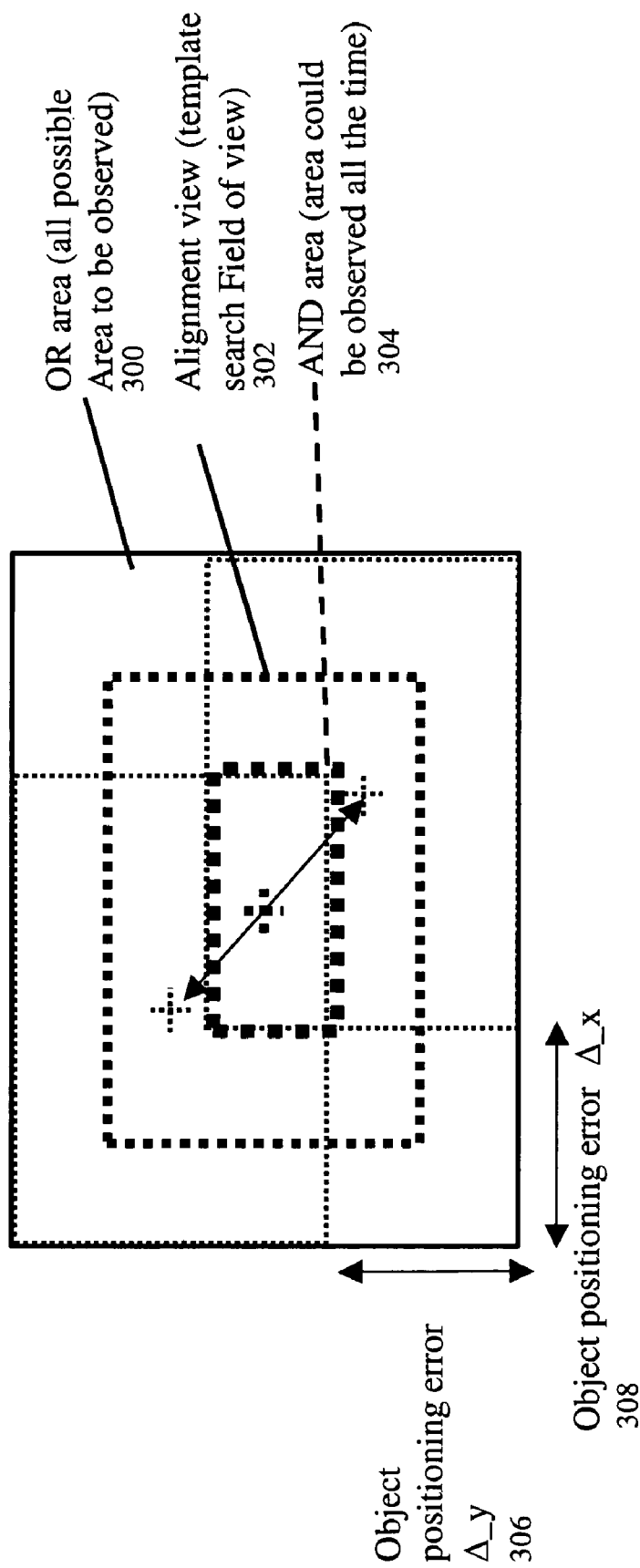
FIG. 3 illustrates the OR area, the alignment view, and the AND area.

Pattern Search Alignment (PSA) module is designed to perform alignment using template pattern search method. Its purpose is to perform alignment within the known object positioning error 306, 308. The operating condition is defined by OR area, alignment view, and AND area. FIG. 3 illustrates the definition of the OR area 300, the alignment view 302, and the AND area 304. The alignment view 302 is the area that will be used for alignment template pattern search. In one embodiment of the invention, the alignment view 302 is the camera (sensor) Field Of View (FOV). The AND area 304 is the common area that could be observed all the time when the object is subjected to the object positioning error 306, 308. The OR area 300 is all possible areas to be observed when the alignment view 302 is subjected to the object positioning error 306, 308. Let the object positioning error be $\Delta\_x$ 308 in the X direction and $\Delta\_y$ 306 in the Y direction, then the relationship between the sizes of the OR area 300 (OR_x, OR_y), the AND area 304 (AND_x, AND_y) and the alignment view 302 (Alignment_view_x, Alignment_view_y) are:

$$OR\_x = \text{Alignment\_view}\_x + \Delta\_x;$$
$$OR\_y = \text{Alignment\_view}\_y + \Delta\_y$$

$$AND\_x = \text{Alignment\_view}\_x - \Delta\_x; AND\_y = \text{Alignment\_view}\_y - \Delta\_y.$$

Figure 4B:
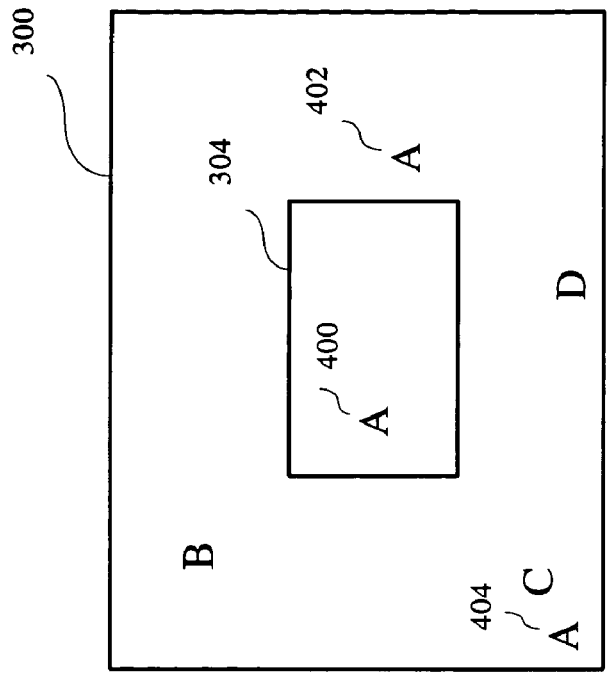
FIG. 4B shows that the pattern "A" in the AND area is not unique.
Figure 4A:
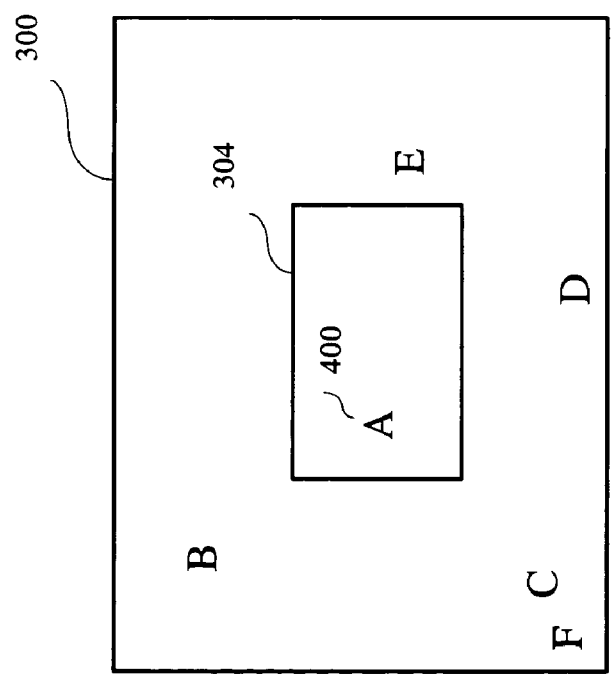
FIG. 4A illustrates an example of a unique pattern "A" in the AND area.

The AND area 304 is the largest region where the template pattern could be selected and be guaranteed to appear in all alignment views when the object is subjected to all possible positioning errors. A good template is a template that contains patterns which is unique (unambiguous) within the entire OR area 300. If similar patterns exist within the OR area 300, alignment view 302 of multiple positioning errors 306, 308 could have similar template matching results. Therefore, the exact amount of the positioning error could not be determined. FIG. 4A illustrates the example of a unique pattern "A" 400 in the AND area 304 that could be used to generate template for PSA. In contrast, FIG. 4B shows that the pattern "A" 400 in the AND area is not unique due to the existence of other "A"s 402, 404 and therefore, no good template could be generated for PSA.

Figure 5B:
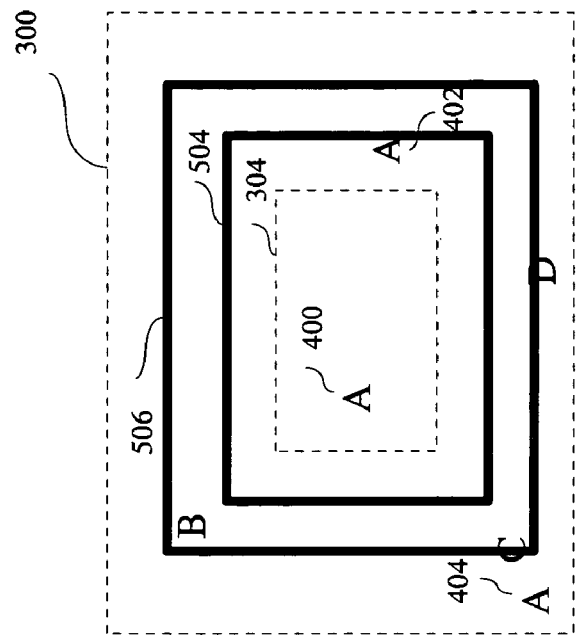
FIG. 5B illustrates the image of FIG. 4B with increased AND area.
Figure 5A:
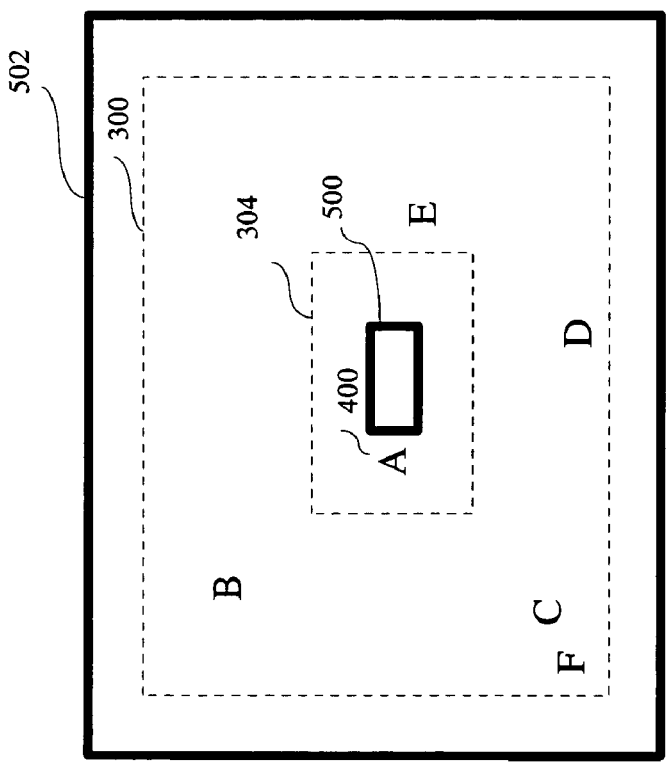
FIG. 5A illustrates the image of FIG. 4A with reduced AND area.

When the AND area decreases, it is likely that an originally unambiguous learning image becomes ambiguous. For example, FIG. 5A illustrates the image of FIG. 4A with reduced AND area 500 (and increased OR area 502 assuming that the size of the alignment view is the same). As can be seen that the reduced AND area 500 no longer contains the pattern "A" 400 and it only contains blank area. The blank area is ambiguous and therefore no template could be generated for PSA any more. In contrast, when the AND area increases, it is likely that an originally ambiguous learning image becomes unambiguous. FIG. 5B illustrates the image of FIG. 4B with increased AND area 504 (and decreased OR area 506 assuming that the size of alignment view is the same). As can be seen that the increased AND area 504 contains two "A"s 400, 402 which together are unique within the reduced OR area. Therefore, unambiguous template could be generated from the AND area for PSA.

In the application where the AND area is small due to large object positioning error, it becomes very difficult to find unambiguous pattern for PSA. This is a major problem that could fundamentally hinder the practical use of the PSA. This invention overcomes this problem using a partition pattern match and integration method. This method generates multiple partition templates, each from a larger sized region. There is no guarantee that a new alignment view will contain all of the multiple partition templates. However, it is guaranteed that the new alignment view should contain at least one of the partition templates. Therefore, the pattern search is performed for each partition template separately and then integrates the results. The generation of partition templates from larger regions increases the odds of selection of unambiguous patterns for good PSA results.

Figure 6B:
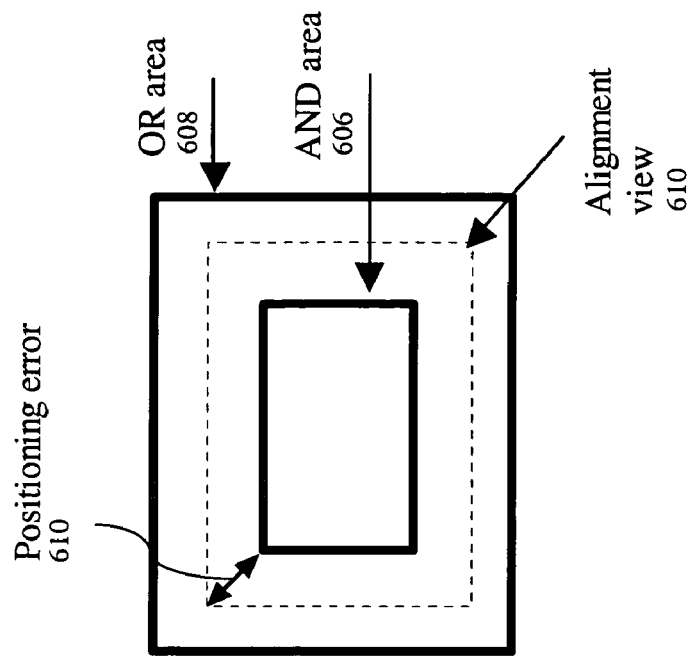
FIG. 6B illustrates the OR area expands and the AND area shrinks when the positioning errors are non-zero.

The maximum possible AND area size is the size of the alignment view 604. This condition exist when the object positioning errors are zero in both X and Y directions. In this case, the region of AND area 600 is identical to the region of OR area 602. The OR area 608 expands and the AND area 606 shrunk from the size of the alignment view 610 when the object positioning errors are non-zero. This is illustrated in FIG. 6A and FIG. 6B.

Figure 6A:
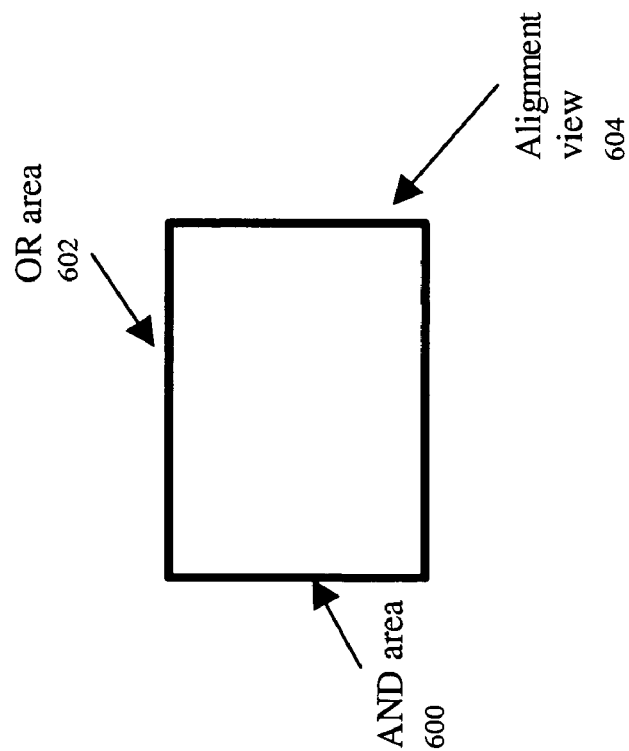
FIG. 6A illustrates maximum possible AND area size is the size of the alignment view.

As shown in FIG. 6A, when the positioning error is zero, the AND area 600, OR area 602, and alignment view 604 are coincided in the identical region. FIG. 6B illustrates that AND area 606 is shrunk from the size in FIG. 6A and OR area 608 is expanded when the object positioning error is non-zero. In both cases, the center alignment view 604 is unchanged which is the maximum possible region of AND area 600 and the minimum possible region for the OR area 602.

In one embodiment of the invention, the center alignment view is divided into four partition template generation regions. A template is generated for each of the four partition template generation regions. The four partition template generation regions do not have to be mutually exclusive. In the preferred embodiment of the invention, the four partial regions share a common intersection region which is the AND area 702. This is illustrated in FIG. 7.

Figure 7A:
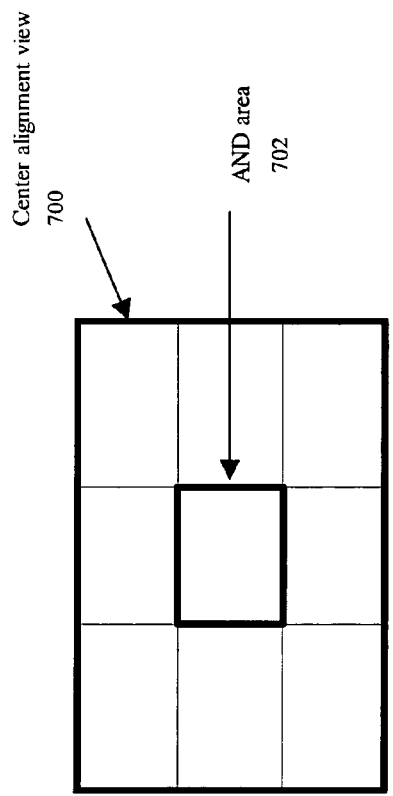
FIG. 7A illustrates a center alignment view and the AND area of an illustrative example.
Figure 7C:
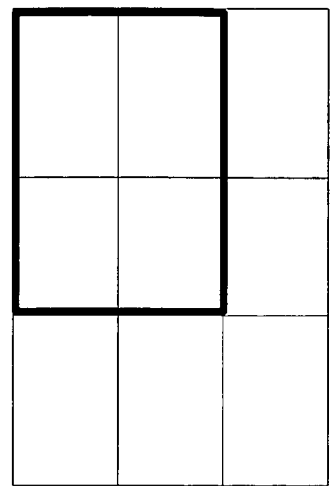
FIG. 7C thick line highlights of the partition template generation region 2.
Figure 7B:
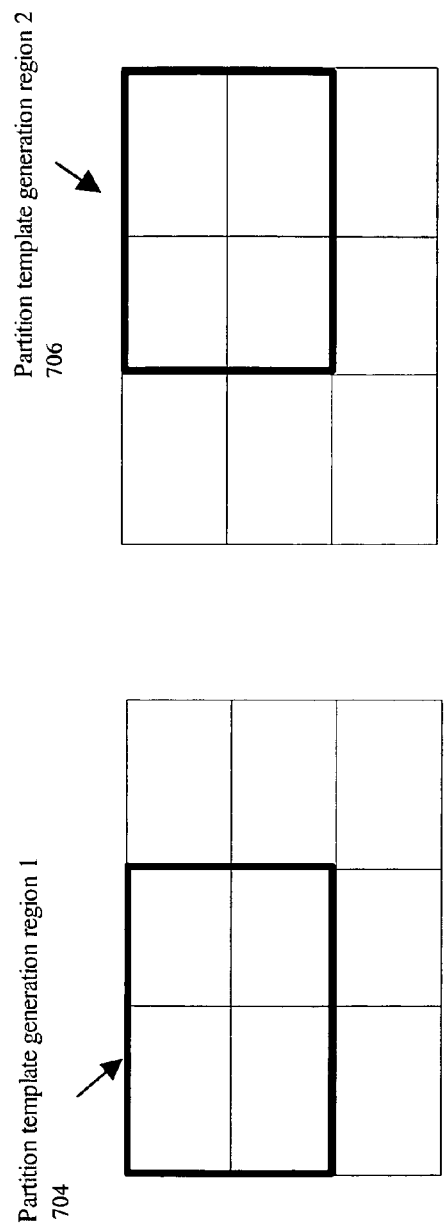
FIG. 7B thick line highlights of the partition template generation region 1.
Figure 7E:
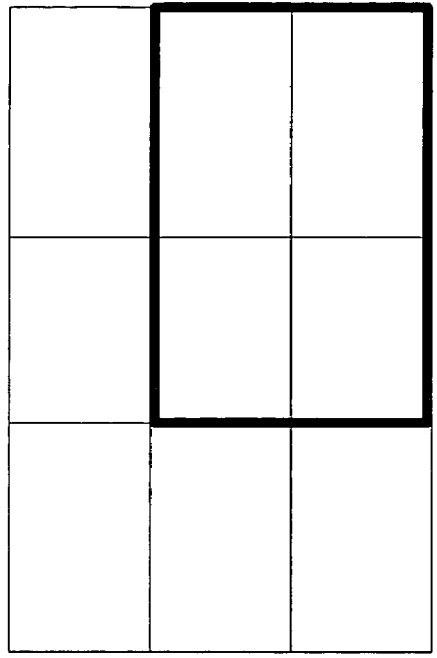
FIG. 7E thick line highlights of the partition template generation region 4.
Figure 7D:
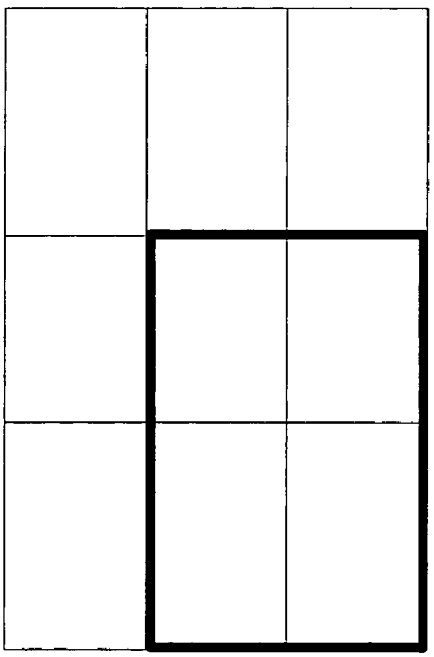
FIG. 7D thick line highlights of the partition template generation region 3.

FIG. 7A shows a center alignment view 700 and the AND area 702 of an illustrative example. FIG. 7B highlights (in thick line) the partition template generation region 1 704, which occupies the upper left portion of the center alignment view 700; FIG. 7C highlights (in thick line) the partition template generation region 2 706 which occupies the upper right portion of the center alignment view 700; FIG. 7D highlights (in thick line) the partition template generation region 3 708 which occupies the lower left portion of the center alignment view 700; FIG. 7E highlights (in thick line) the partition template generation region 4 710 which occupies the lower right portion of the center alignment view 700.

Those skilled in the art should recognize that the number of template generation region partitions does not have to be 4. It could be 2, 3, 5, or other integer numbers. They are all within the scope of this invention.

The OR area consists of the union of the alignment views subjected to all possible object positioning errors. The OR area 800 could be divided into 4 partition OR regions 802, 804, 806, 808 as shown in FIG. 8. Each of the partition OR regions 802, 804, 806, 808 corresponds to certain subset of the object positioning errors.

Figure 8E:
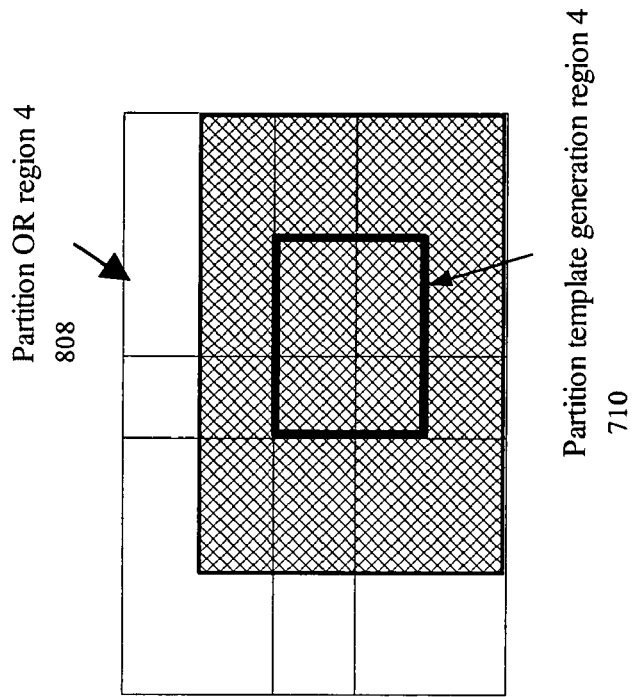
FIG. 8E thick line highlights of the partition template generation region 4 and the partial OR region 4 in dotted background.
Figure 8D:
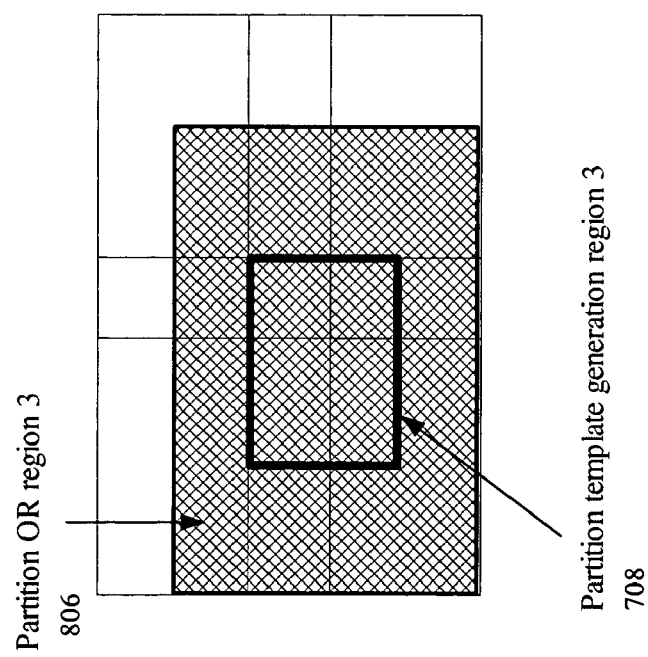
FIG. 8D thick line highlights of the partition template generation region 3 and the partition OR region 3 in dotted background.

FIG. 8A illustrates an OR area 800, the center alignment view 700 and the AND area 702 of an illustrative example. FIG. 8B highlights (in thick line) the partition template generation region 1 704 and the partition OR region 1 802 (in dotted background). FIG. 8C highlights (in thick line) the partition template generation region 2 706 and the partition OR region 2 804 (in dotted background). FIG. 8D highlights (in thick line) the partition template generation region 3 708 and the partition OR region 3 806 (in dotted background). FIG. 8E highlights (in thick line) the partition template generation region 4 710 and the partial OR region 4 808 (in dotted background.)

The partition template generation region i (where i is one of the 1, 2, 3, or 4) 704, 706, 708, 710 is the common area that could be observed all the time when the object is subjected to the object positioning errors associated with partition OR region i 802, 804, 806, 808. Since the union of the 4 partition OR regions 802, 804, 806, 808 covers the complete OR area 800 (that is, it possible covers all object positioning errors), therefore, it is guaranteed that the at least one of the partition template generation regions 704, 706, 708, 710 could be observed for each of the alignment views within the OR area 800.

When the AND area is small due to large object positioning error, it becomes very difficult to find unambiguous pattern within the AND area for PSA. However, the partition template generation region contains at least a quarter of the alignment view size even when the AND area is very small. Therefore, a great advantage could be achieved by using the partition template generation region to generate partition template for pattern template search. Due to the reasonable size region for template generation, the partition template generation region is likely to contain patterns that are unique throughout the whole OR area.

Since at least one of the template generation region partitions could be observed for each of the alignment views within the OR area. The partition pattern match and integration method of this invention uses the partition template generation regions to generate partition templates and performs pattern search using all partition templates and then integrates the partition template pattern search results.

II. Partition Pattern Template Generation Method

Figure 9:
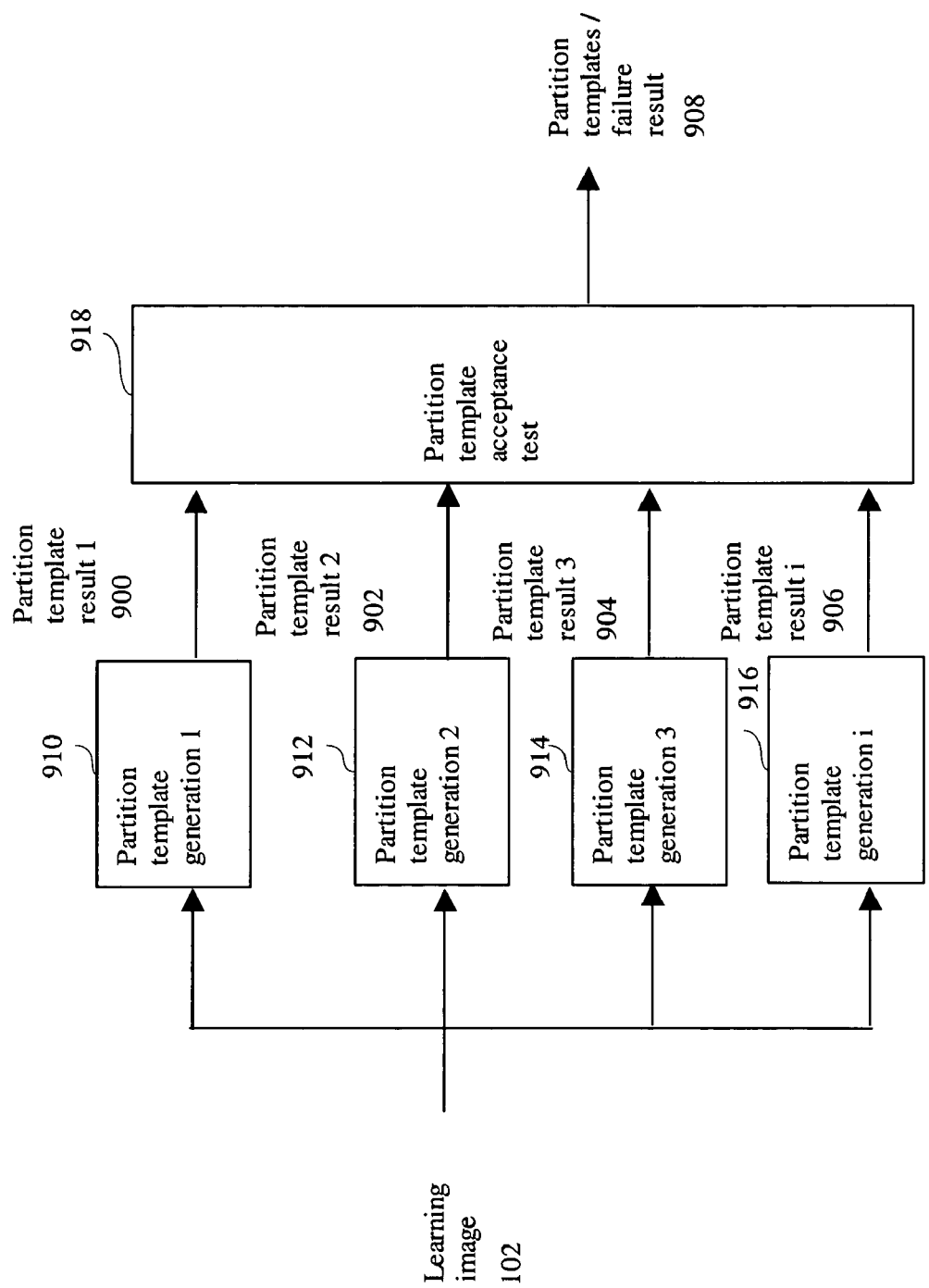
FIG. 9 shows the processing flow for the partition pattern template generation method.

FIG. 9 shows the processing flow for the partition pattern template generation method. A learning image 102 is processed by a plurality of partition template generation steps 910, 912, 914, 916. Each of the partition template generation steps 910, 912, 914, 916 performs similar template generation process using different template generation region partitions extracted from the learning image 102. The partition template generation 1 910 step uses the template generation region partition 1 as the template selection region and uses the whole OR area as the ambiguity check region. Similarly, the other partition template generation steps use their corresponding template generation region partitions as the template selection regions and use the whole OR area as the ambiguity check region. This results in a plurality of partition template result output (the partition template result 1 900, partition template generation result 2 902, etc. 904, 906). Each partition template result 900, 902, 904, 906 contains its partition template and/or template generation status information. The partition template generation results 900, 902, 904, 906 are processed by a partition template acceptance test 918 step that checks the acceptance status of the plurality of partition template generation 910, 912, 914, 916 and generates partition templates if the template generation is acceptable 908. Otherwise, it outputs failure result 908. The partition templates 908 include all partition templates and their associated information such as their alignment reference positions. The failure results 908 include a simple failure status or it may contain additional information such as the partition number(s) that causes failure(s), the cause(s) of the failure(s), and/or the suggested stage move direction for the alternative template learning image acquisition.

Those skilled in the art should recognize that different numbers of template generation region partitions could be used. The number of partition template generation steps should match the number of template generation region partitions. They are all within the scope of this invention.

II.1 Partition Template Generation

Figure 10:
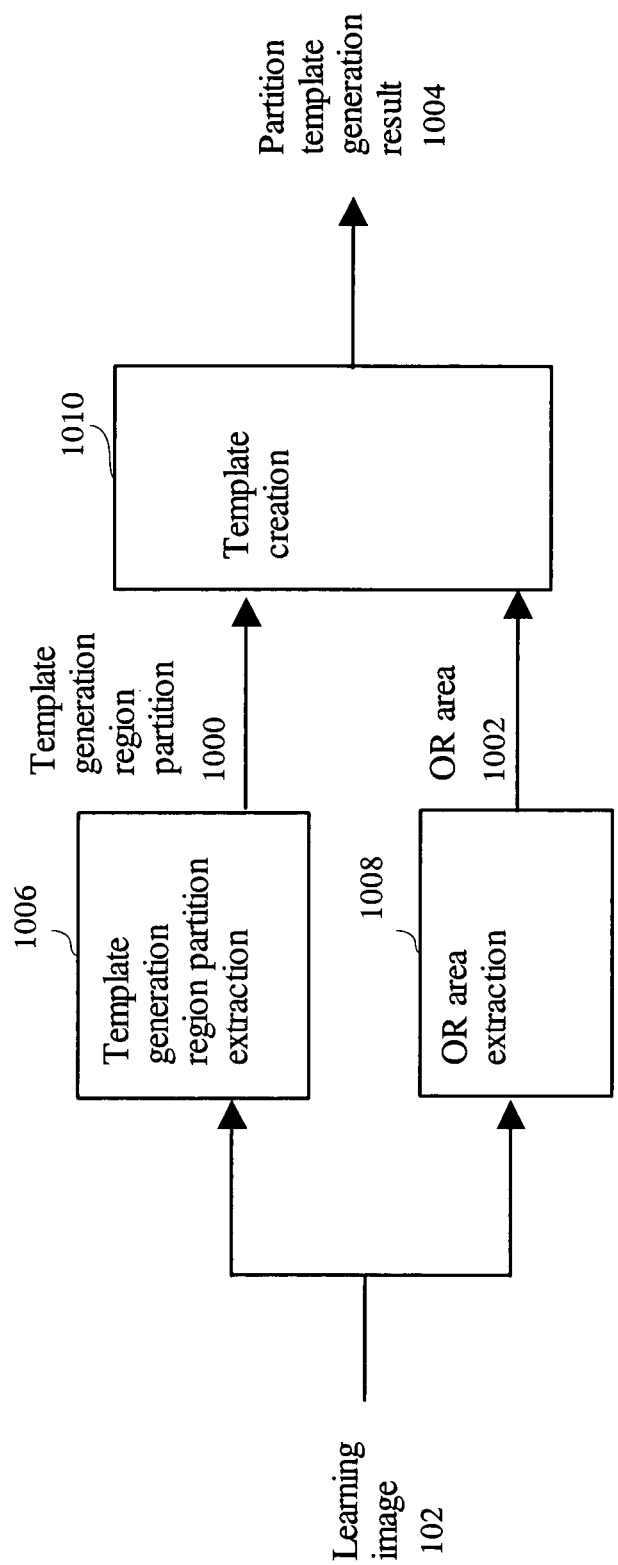
FIG. 10 shows the processing flow for the partition template generation method.

The partition template generation step uses a template generation region partition as the template selection region and uses the whole OR area as the ambiguity check region. The partition template generation processing flow is shown in FIG. 10. As shown in FIG. 10, the learning image 102 is processed by a template generation region partition extraction 1006 step to extract the desired template generation region partition 1000 (one of the template generation region partitions). The OR area 1002 is also extracted from the learning image by an, OR area extraction step 1008 based on the size of the alignment view and the maximum object positioning error. The template generation region partition 1000 and the OR area 1002 are used by a template creation step 1010 to create the partition template generation result 1004. The template creation step 1010 selects template candidates using the template generation region partition 1000 and uses the OR area 1002 for the ambiguity check.

In one embodiment of the invention, the template creation is performed using the following method. The selection area of the template is a region extracted from the input template generation region partition 1000 (template selection region). The best template region can be determined as the region that yields the maximum measurement such as discrimination power within the template selection region. In one embodiment of the invention, the discrimination power, Disc, for a given template is defined as:

$$Disc = \sqrt{S}\left(1 - \frac{M_2}{M_1}\right)$$

Where S is the signal content of the template and $M_1$ is the maximum matching value and $M_2$ is the second maximum matching value within the ambiguity check region which is the input OR area. In one embodiment of the invention, the matching value is the correlation result from the normalized correlation (Ballard D H and Brown C M, "Computer Vision", Prentice-Hall Inc. 1982 pp. 68-70). In another embodiment, a cost function E that is the weighted square error between the template and gain and offset compensated image is defined as:

$$E = \sum_{template region} w[x][y](\alpha I[x-xs][y-ys] + \beta - I_t[x][y])^2$$

where
I[x][y] is the input image;
$I_t$[x][y] is the template image;
w[x][y] is the weighting image that is given or derive from a learning process.
α and β are gain and offset compensation that are computed to minimize the cost function E.

The minimization of cost E is equivalent to the maximum of the following matching function:

$$Matching\ (xs, ys) = \frac{CV(I[x-xs][y-ys], I_t[x][y])}{CV(I[x-xs][y-ys], I[x-xs][y-ys])}$$

Where $$CV(I_1[x][y], I_2[x][y]) = <I_1[x][y] * I_2[x][y]> - \{I_1[x][y]> < I_2[x][y]>$$

and where $$<I[x][y]> = \frac{\sum_{x,y} w[x][y]I[x][y]}{\sum_{x,y} w[x][y]}$$

(i.e. <I[x][y]> means compute the weighted average for the image as shown here)

Figure 11:
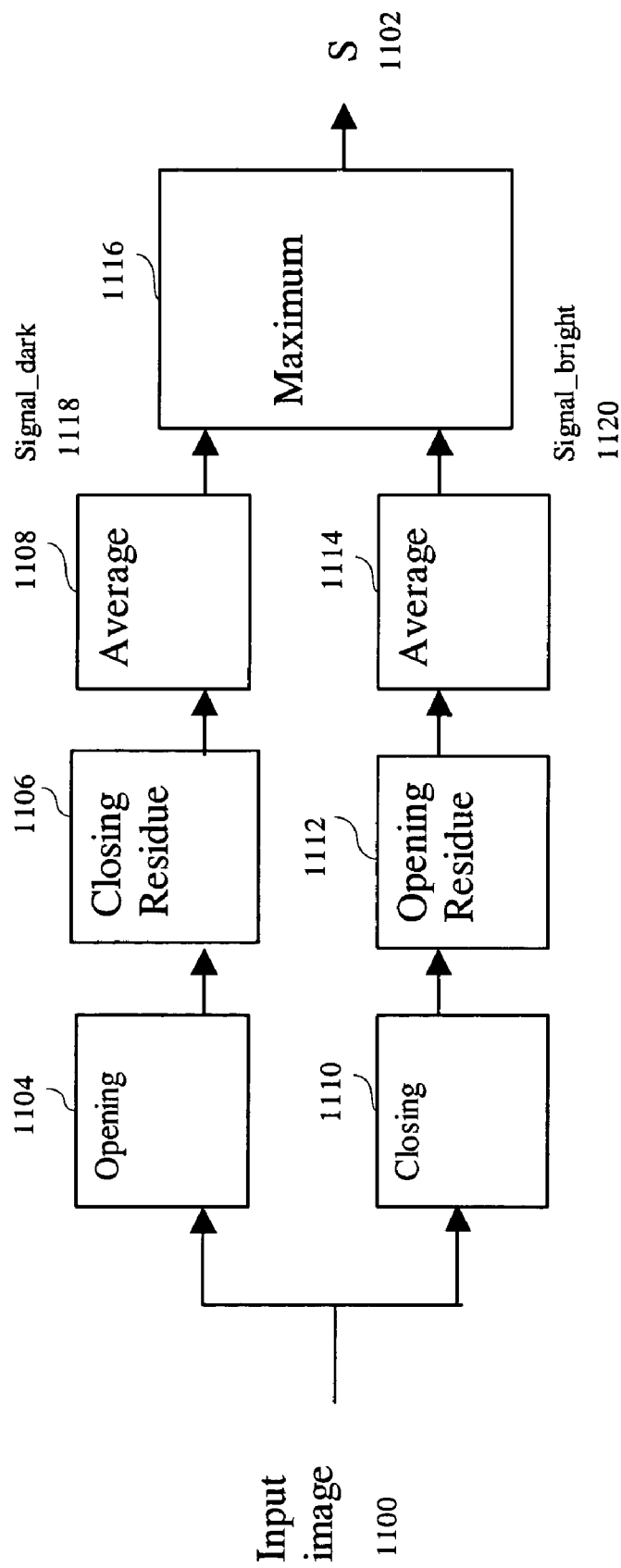
FIG. 11 shows the processing flow for the signal enhancement method.

In one embodiment of the invention, the signal enhancement process is shown in FIG. 11. The signal enhancement process is useful to reduce the effects of image noise during template generation. The nature of the noise influences the designer's choice for signal enhancement. The signal enhancement method shown in FIG. 11 emphasizes lines in the image as the best measure of signal content. The upper portion of FIG. 11 1104, 1106, 1108 processes dark lines of the input image 1100 and the lower portion of FIG. 11 1110, 1112, 1114 processes bright lines of the image. In FIG. 11, opening 1104 is the grayscale morphological opening operation and closing 1110 is the grayscale morphological closing operation. The closing residue 1106 operation performs a grayscale morphological closing operation and then subtracts the pre-closing image from it. The opening residue 1112 operation performs a grayscale morphological opening operation and then subtracts it from the pre-closing image. The resulting image is averaged 1108, 1114 over the template region. The average over the template region can be calculated as:

$$Signal = \frac{\sum_{all\ x,y} I_s[x][y]}{\sum_{all\ x,y} 1}$$

where $I_s$[x][y] is the signal enhanced image.

The maximum 1116 of average results of dark lines, Signal_dark 1118, and bright lines Signal_bright 1120, is the enhanced signal S 1102.

The partition template generation result contains the template associated with the template region having the highest discrimination power as well as the value of Disc, M1, and S.

Those skilled in the art should recognize that other method of template generation could be used. For example, the multi-resolution template generation method with pre-processing as disclosed in Oh and Lee, "Automatic template generation and searching method", U.S. Pat. No. 6,603,882, Aug. 5, 2003 could be used to perform template creation. In addition, the template could include multiple components decomposition and synthesis as disclosed in Oh and Lee, "Fast invariant matching using template decomposition and synthesis", U.S. patent application Ser. No. 10/419,913, Apr. 16, 2003, which is incorporated in its entirety herein. Furthermore, other prior art methods of template region selection method including geometric pattern matching method such as PatMax introduced by Cognex (Silver, B, "Geometric Pattern Matching for General Purpose Inspection in Industrial Machine Vision", Intelligent Vision '99 Conference—Jun. 28-29, 1999) could be used for the template creation.

Those skilled in the art should recognize that the partition methods of this invention could be generalized to include rotation and scale invariant pattern matching method such as that is disclosed in Lee, Oh, Seghers, "Rotation and scale invariant pattern matching method", U.S. Pat. No. 6,640,008, Oct. 28, 2003.

II.2 Partition Template Acceptance Test

The partition template acceptance test step inputs the partition template generation results from all partition template generation stages. It checks the quality of the partition templates. In one embodiment of the invention, the discrimination powers associated with the partition templates are checked. If any of the partition templates has the discrimination power value below a minimum threshold, the partition template acceptance test will be considered fail. Similarly, the maximum matching value M1 associated with the partition templates can be checked. If any of the partition templates has the M1 value below a minimum threshold, the partition template acceptance test will be considered fail. In the same manner, the signal content of the template associated with the partition templates can be checked. If any of the partition templates has the S value below a minimum threshold, the partition template acceptance test will be considered fail.

In addition, other parameters could be used for tests such as the average Disc value among all partition templates, the average M1 value among all partition templates, and the average S value among all partition templates, etc. When the partition template generation results fail the acceptance test, the failure results are outputted. The result could be a simple failure status or additional information such as the partition number(s) caused failure, the cause(s) of the failure(s) such as the specific tests (minimum Disc test, average Disc test, minimum M1 test, average M1 test, minimum S test, and average S test, etc.) and/or the suggested stage move direction for the alternative template learning image acquisition. In one embodiment of the invention, the directions (upper left, lower right, etc.) associated with the partition template having the highest Disc value is selected as the suggested stage move direction. Those skilled in the art should recognize that other criteria such as M1, S, etc. could be used for the suggested stage move direction selection.

If the partition template generation results pass the partition template acceptance test, the partition template data structures (region image, reference position, etc.) are stored into a common partition template generation result.

III. Partition Template Search Method

Figure 12:
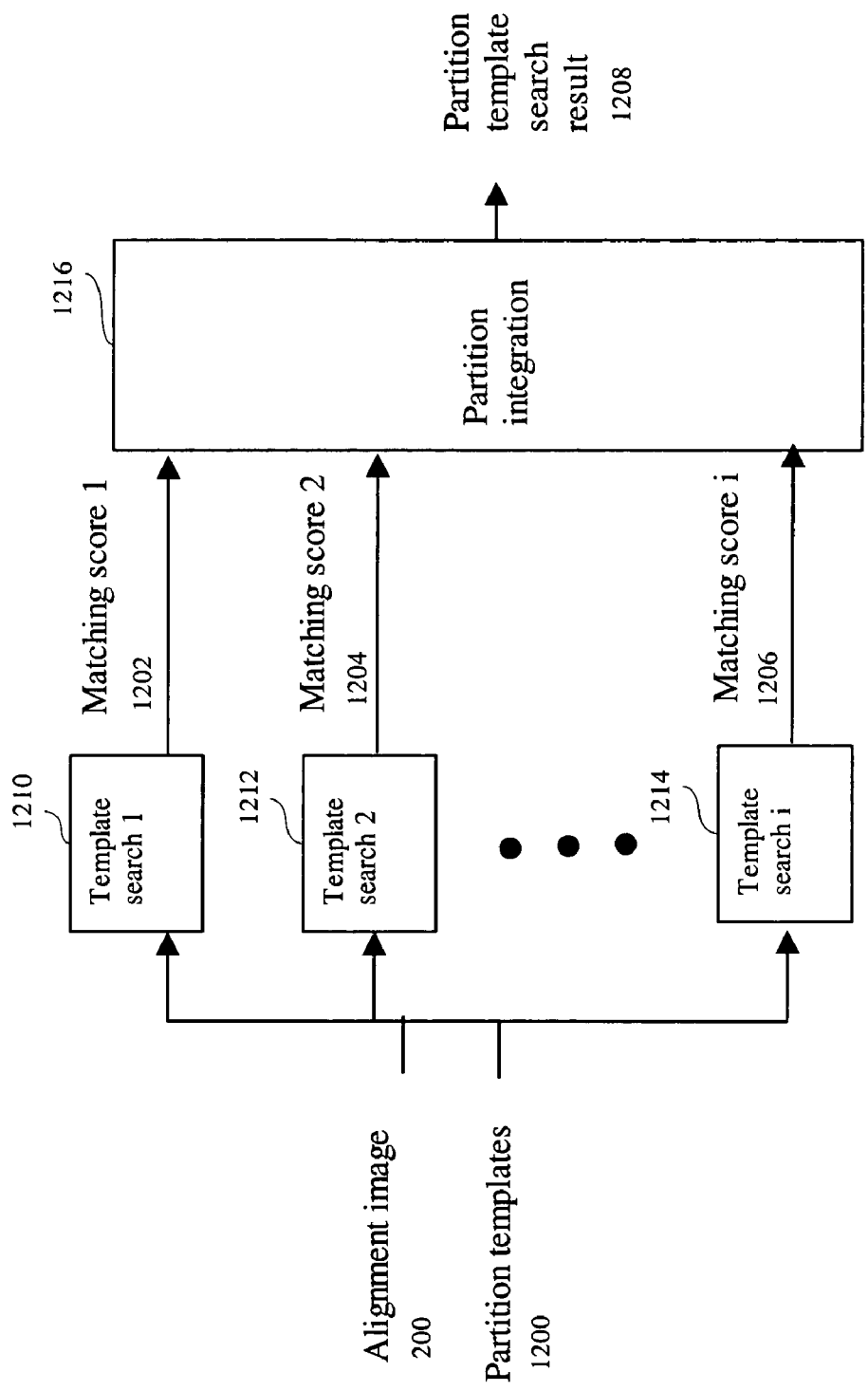
FIG. 12 shows the processing flow for the partition template search method.

The processing flow for the partition template search of this invention is shown in FIG. 12. An alignment image 200 and the partition templates 1200 are inputted to a plurality of template search steps 1210, 1212, 1214. The number of the template search steps should be equal to the number of the partition templates. Each template search step 1210, 1212, 1214 searches using a partition template against the whole alignment image 200 to generate a matching score 1202, 1204, 1206 output that contains the matching score(s) for a single or a plurality of match candidates. A partition integration step 1216 inputs the matching scores 1202, 1204, 1206 for all template search 1210, 1212, 1214 steps and generates a partition template search result 1208 output.

III.1 Template Search

Each template search step searches using a partition template against the alignment image to generate a matching score output that contains the matching score(s) for a single or a plurality of match candidates. In one embodiment of the invention, the template search uses the normalized correlation method and the correlation coefficient serves as the matching score. In another embodiment of the invention, the matching function defined in section II.1 is used.

Those skilled in the art should recognize that other methods of template search could be used. For example, the multi-resolution coarse to fine template search method disclosed in Oh and Lee, "Automatic template generation and searching method", U.S. Pat. No. 6,603,882, Aug. 5, 2003 could be used to perform template search. In addition, the template search could include multiple components decomposition and synthesis as disclosed in Oh and Lee, "Fast invariant matching using template decomposition and synthesis", U.S. patent application Ser. No. 10/419,913, Apr. 16, 2003, which is incorporated in its entirety herein. Furthermore, other prior art template search methods including geometric pattern matching method such as PatMax introduced by Cognex (Silver, B, "Geometric Pattern Matching for General-Purpose Inspection in Industrial Machine Vision", Intelligent Vision '99 Conference—Jun. 28-29, 1999) could be used for this purpose.

Those skilled in the art should recognize that the partition and integration methods of this invention could be generalized to include rotation and scale invariant pattern matching method such as that is disclosed in Lee, Oh, Seghers, "Rotation and scale invariant pattern matching method", U.S. Pat. No. 6,640,008, Oct. 28, 2003.

III.2 Partition Integration

The partition integration 1216 step inputs the matching scores 1202, 1204, 1206 outputted from all template search steps 1210, 1212, 1214 and generates a partition template search result 1208 output. The partition template search result output contains the best search position. It may also contain alternative search candidates. In the case that no good search candidates are found, the partition template search result contains a search failure status and related information. In one embodiment of the invention, the partition integration method includes a basic method. In an alternative embodiment of the invention, an error self checking method is used for partition integration.

A. Basic

In one embodiment of the invention, the basic partition integration method of this invention is simply a maximum operation that inputs the matching scores 1202, 1204, 1206 from all template search steps 1210, 1212, 1214. In this case, the position corresponds to this maximum matching score is the template search result position and the maximum matching score is the matching score output of this step. Under this embodiment, the maximum matching score could be checked against a threshold and if it is below the threshold, the search is considered a failure.

B. Error Self Checking

Figure 13A:
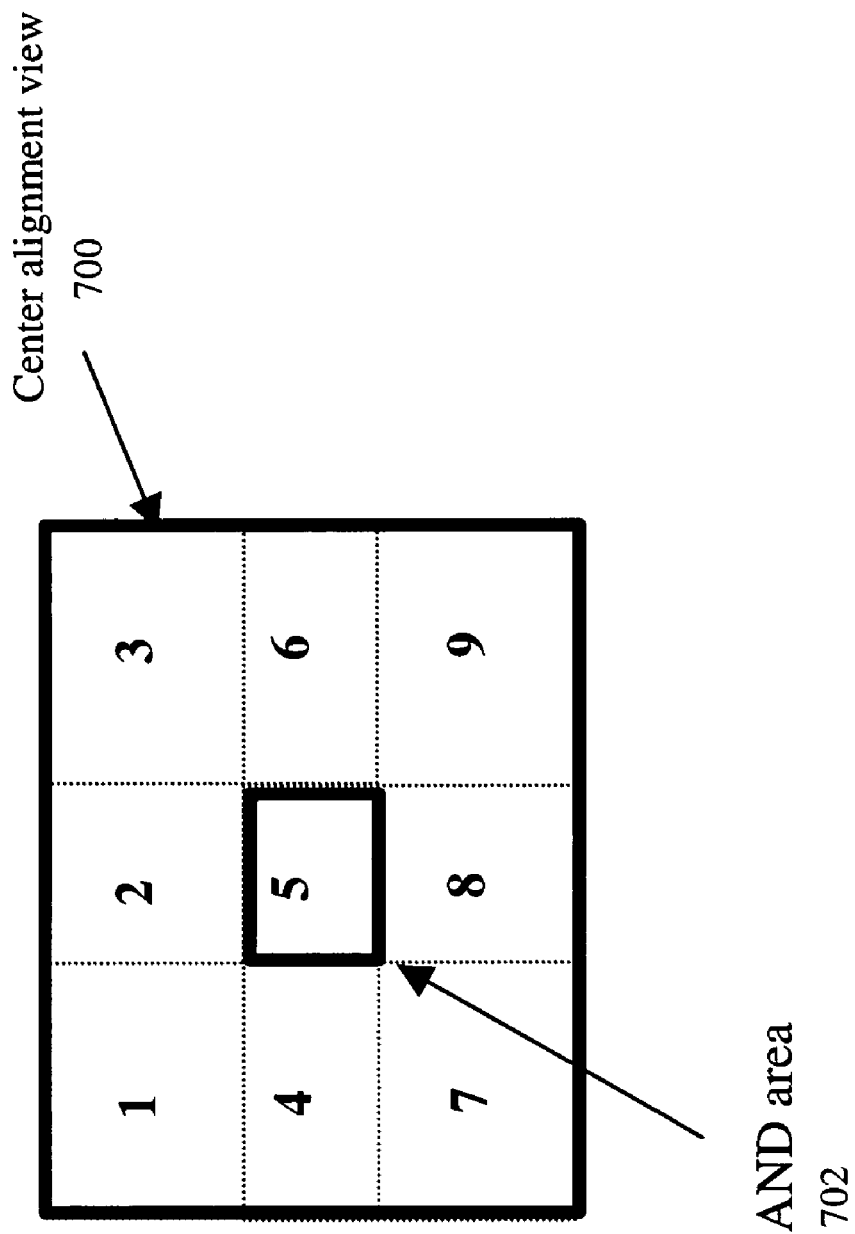
FIG. 13 shows the zone assignment for the illustrative center alignment view and AND area as shown in FIG. 7A.

In another embodiment of the invention, the partition integration step performs self checking to enhance the reliability of the template search result. As shown in FIG. 8A-FIG. 8E, an alignment view could be covered by a single or a plurality of the template generation region partitions. The expected matching scores for an alignment view could therefore be determined based on the zone (a group of nearby locations) to which the center of the alignment view belongs. FIG. 13A shows an illustrative center alignment view 700 and AND area 702 as shown in FIG. 7A. The center alignment view region 700 can be divided into nine zones (zone numbers 1, 2, 3, 4, 5, 6, 7, 8, and 9). The mapping between the zones and the partition template coverage for the 4 partition cases of FIG. 8B-FIG. 8E is shown in FIG. 13B.

Each entry of the table in FIG. 13B corresponds to a unique zone and partition combination. If the entry is labeled "X", then when the center of an alignment view is located in its corresponding zone, the corresponding partition should be covered by the alignment view. This means that we expect high matching score for the template search from that partition. If the entry is not labeled "x", the alignment view falls into the zone is not expected to have high matching score from the corresponding partition. Otherwise, the template will be ambiguous and should not be generated. Based on the above mapping information, an error self checking method can be performed after a preliminary template search is completed (the preliminary template search could be based on the basic method described above). The preliminary template search result includes the preliminary template search result position that can be converted into a zone. The zone maps to the expected partition matching scores that can be used to check the actual partition matching score profile. If significant difference exists, an error is detected. The processing flow for the error self checking integration is shown in FIG. 14.

Figure 14:
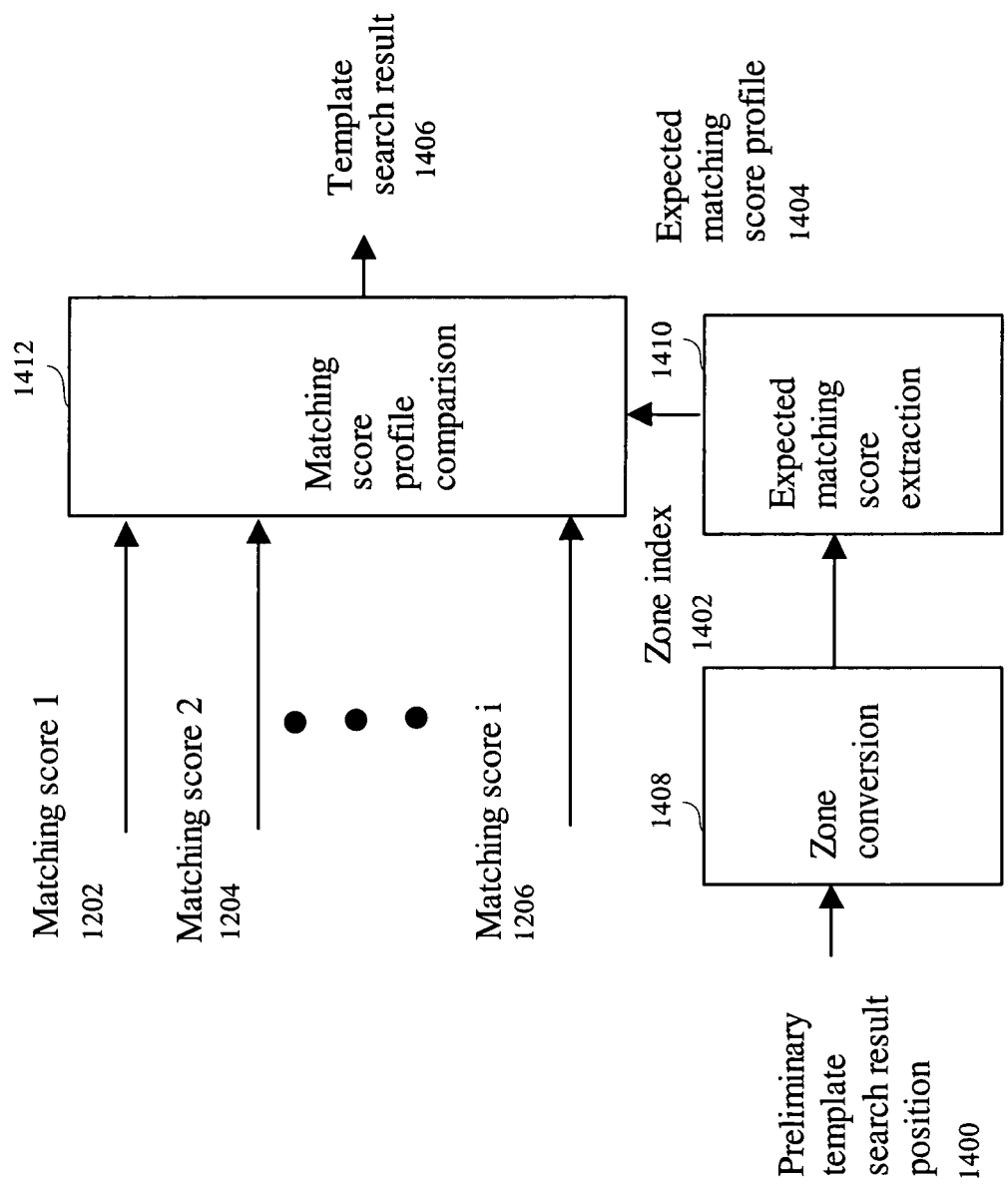
FIG. 14 shows the processing flow for the error self checking integration method.

As shown in FIG. 14, a preliminary template search result position 1400 is inputted. The preliminary template search result position 1400 could be generated using the basic method described above. The preliminary template search result position 1400 is processed by a zone conversion 1408 step that maps the location into a zone index 1402 output using the mapping function that can be generated from the mapping illustration as shown in FIG. 13A and FIG. 13B. The zone index 1402 is processed by the expected matching score extraction 1410 step to generate an expected matching score profile 1404 output. The expected matching score profile 1404 is compared with the actual partition matching score profile 1202, 1204, 1206 by the matching score profile comparison 1412 step. If no significant difference is detected, the result derived from the preliminary template search result position is used for template search result 1406. If significant difference exists, an error is detected. In this case, alternative candidates may be considered and if a maximum number of candidates were checked and none of them matched the expected partition score profile, the search is considered a failure and the failure status is the template search result 1406.

In one embodiment of the invention, the matching score profile comparison 1412 step normalizes the expected matching score profile 1404 so that the total matching values from the profile is identical to the actual matching score profile 1202, 1204, 1206. The absolute difference between the profiles is calculated as a proportion of the total matching score. This is used for comparison with a threshold to determine the significance of the difference between the profiles in the result of the matching sore profile comparison step. In another embodiment of the invention, statistical test such as $\chi^2$ test can be used to compare two the two profiles. The $\chi^2$ value or the p-value could be used to determine the significance of the difference between the profiles.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A partition pattern template generation method for alignment of large positioning error where common area that can be always observed is small using partitioned pattern match and integration comprising one or more computers implementing:
    a) Inputting a learning image for template generation;
    b) Performing alignment within the known positioning error [$\Delta\_x$ in the X direction and $\Delta\_y$ in the Y direction];
    c) Determining all possible areas [OR area] to be observed when alignment view is subjected to the known object positioning error and AND area is largest region where a template pattern could be selected and be guaranteed to appear in all alignment views when object is subjected to all possible positioning errors;
    d) Performing a plurality of partition template generation using a template generation region partition as template selection region and using the OR area as ambiguity check region;
    e) Determining best template region as the region yielding the maximum discrimination power within the template selection region wherein the discrimination power, Disc, for a given template is defined as:

$$Disc = \sqrt{S}\left(1 - \frac{M_2}{M_1}\right)$$

Where S is signal content of the given template and $M_1$ is maximum matching value and $M_2$ is second maximum matching value within the ambiguity check region.

* * * * *